(12) United States Patent
Todeschini

(10) Patent No.: US 12,210,162 B2
(45) Date of Patent: Jan. 28, 2025

(54) SCANNING DEVICE

(71) Applicant: Hand Held Products, Inc., Charlotte, NC (US)

(72) Inventor: Erik Todeschini, Camillus, NY (US)

(73) Assignee: Hand Held Products, Inc., Charlotte, NC (US)

( * ) Notice: Subject to any disclaimer, the term of this patent is extended or adjusted under 35 U.S.C. 154(b) by 0 days.

(21) Appl. No.: 18/349,703

(22) Filed: Jul. 10, 2023

(65) Prior Publication Data

US 2023/0350211 A1 Nov. 2, 2023

Related U.S. Application Data

(63) Continuation of application No. 16/999,416, filed on Aug. 21, 2020, now Pat. No. 11,740,463, which is a continuation of application No. 16/288,274, filed on Feb. 28, 2019, now Pat. No. 10,802,284, which is a continuation of application No. 15/720,149, filed on Sep. 29, 2017, now Pat. No. 10,254,548.

(51) Int. Cl.
*G02B 27/01* (2006.01)
*G06K 7/10* (2006.01)
*G06K 7/14* (2006.01)
*H04N 13/344* (2018.01)

(52) U.S. Cl.
CPC ....... *G02B 27/0172* (2013.01); *G02B 27/017* (2013.01); *G06K 7/10722* (2013.01); *G06K 7/1095* (2013.01); *G06K 7/1443* (2013.01); *G06K 7/1447* (2013.01); *H04N 13/344* (2018.05); *G02B 2027/0138* (2013.01); *G02B 2027/014* (2013.01); *G02B 2027/0141* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 5,742,263 | A | 4/1998 | Wang et al. |
| 10,254,548 | B1 | 4/2019 | Todeschini |
| 10,802,284 | B2 | 10/2020 | Todeschini |

(Continued)

OTHER PUBLICATIONS

Danhof et al.; "A Virtual-Reality 3d-Laser-Scan Simulation;" Jan. 2015: BW-CAR Symposium on Information and Communication Systems 2015; pp. 1-7 (Year: 2015).*

(Continued)

*Primary Examiner* — Peter Hoang
(74) *Attorney, Agent, or Firm* — Alston & Bird LLP

(57) ABSTRACT

Example methods, apparatuses and systems are disclosed for providing a device for capturing a barcode image within an augmented reality environment. An example method includes detecting a target object within a field of view of an augmented reality viewing device. The method further includes rendering an image of a scanning device within the field of view of the augmented reality viewing device, and rendering a scanning area within the field of view of the augmented reality viewing device. Further, a camera associated with the augmented reality viewing device captures an image of a barcode located on the target object. Corresponding apparatuses, systems, and computer program products are also provided.

20 Claims, 5 Drawing Sheets

(56) References Cited

U.S. PATENT DOCUMENTS

| | | | | |
|---|---|---|---|---|
| 2009/0084855 A1* | 4/2009 | Herwig | ............... | G06K 7/10722 235/462.41 |
| 2013/0346168 A1 | 12/2013 | Zhou et al. | | |
| 2014/0225903 A1 | 8/2014 | Tremblay et al. | | |
| 2016/0267808 A1* | 9/2016 | Agostini | ................... | G09B 5/06 |

OTHER PUBLICATIONS

U.S. Appl. No. 16/999,416, filed Aug. 21, 2020, U.S. Pat. No. 11,740,463, Issued.
U.S. Appl. No. 16/288,274, filed Feb. 28, 2019, U.S. Pat. No. 10,802,284, Issued.
U.S. Appl. No. 15/720,149, filed Sep. 29, 2017, U.S. Pat. No. 10,254,548, Issued.
Advisory Action (PTOL-303) Mailed on Nov. 12, 2019 for U.S. Appl. No. 16/288,274, 3 page(s).
Advisory Action (PTOL-303) Mailed on Oct. 24, 2022 for U.S. Appl. No. 16/999,416.
Examiner Interview Summary Record (PTOL-413) Mailed on Mar. 28, 2023 for U.S. Appl. No. 16/999,416, 2 page(s).
Final Rejection Mailed on Aug. 19, 2019 for U.S. Appl. No. 16/288,274, 13 page(s).
Final Rejection Mailed on Jul. 22, 2022 for U.S. Appl. No. 16/999,416.
Hendry, Md Rizal Md, Mohd Noah A. Rahman, and Afzaal H. Seyal. "Smart attendance system applying QR code." 12th International Conference on Latest Trends in Engineering and Technology May 2017. pp. 1-5 (Year: 2017).
M. Maidi, M. Preda, Y. Lehiani and T. Lavric, "Vision-based tracking in large image database for real-time mobile augmented reality," 2014 IEEE 16th International Workshop on Multimedia Signal Processing (MMSP), 2014, pp. 1-6. (Year: 2014).
Non-Final Rejection Mailed on Apr. 2, 2019 for U.S. Appl. No. 16/288,274, 12 page(s).
Non-Final Rejection Mailed on Apr. 23, 2018 for U.S. Appl. No. 15/720,149, 11 page(s).
Non-Final Rejection Mailed on Aug. 19, 2021 for U.S. Appl. No. 16/999,416.
Non-Final Rejection Mailed on Dec. 8, 2022 for U.S. Appl. No. 16/999,416.
Non-Final Rejection Mailed on Dec. 12, 2019 for U.S. Appl. No. 16/288,274, 14 page(s).
Notice of Allowance and Fees Due (PTOL-85) Mailed on Apr. 11, 2023 for U.S. Appl. No. 16/999,416, 8 page(s).
Notice of Allowance and Fees Due (PTOL-85) Mailed on Jun. 11, 2020 for U.S. Appl. No. 16/288,274, 8 page(s).
Notice of Allowance and Fees Due (PTOL-85) Mailed on Nov. 28, 2018 for U.S. Appl. No. 15/720,149, 9 page(s).
Office Action for U.S. Appl. No. 15/720,149 dated Apr. 23, 2018, 11 pages.
T.-H. Chou, C.-S. Ho and Y.-F. Kuo, "QR code detection using convolutional neural networks," 2015 International Conference on Advanced Robotics and Intelligent Systems (ARIS), 2015, pp. 1-5. (Year: 2015).
Vanacken et al., "Exploring the Effects of Environment Density and Target Visibility on Object Selection in 3D Virtual Environments," 2007 IEEE Symposium on 3D User Interfaces, 2007, pp. 117-124. (Year: 2007).

* cited by examiner

SCANNING DEVICE

CROSS-REFERENCE TO RELATED APPLICATION(S)

This application is a continuation application of and claims the benefit of priority to U.S. application Ser. No. 16/999,416 entitled "SCANNING DEVICE" filed on Aug. 21, 2020, which is a continuation application of and claims the benefit of priority to U.S. application Ser. No. 16/288,274 entitled "SCANNING DEVICE" filed on Feb. 28, 2019 subsequently issued as U.S. Pat. No. 10,802,284, which is a continuation application of and claims the benefit of priority to U.S. application Ser. No. 15/720,149 entitled "SCANNING DEVICE" filed on Sep. 29, 2017, subsequently issued as U.S. Pat. No. 10,254,548. The entirety of each of the foregoing applications is incorporated by reference herein.

TECHNOLOGICAL FIELD

Example embodiments of the present invention relate generally to barcode scanning devices and, more particularly, to methods and apparatuses that provide for barcode scanning within an augmented reality system environment.

BACKGROUND

The use of barcodes and other scannable images has proven to be an effective and popular approach to labeling and identifying products. In many situations involving barcodes, handheld scanning devices are used to read the barcode and convey the barcode information to a system capable of decoding the barcode and accessing the information associated with the barcode.

Applicant has identified a number of technical challenges associated with conventional barcode scanning systems and other associated systems and methods. Through applied effort, ingenuity, and innovation, many of these identified challenges have been overcome by developing solutions that are included in embodiments of the present invention, many examples of which are described in detail herein.

SUMMARY

In many environments and situations involving the use, detection, and scanning of barcode images, a handheld scanning device is operated by a user to read or otherwise capture the barcode image and to convey the barcode image information to a system capable of decoding and/or otherwise processing the barcode image information. In some environments, the reliance on a handheld scanner results in an unwieldy, cumbersome, inefficient, and time-consuming series of operations. For example, in a warehouse environment where a user is responsible for acquiring multiple items distributed throughout the area of the warehouse, a user may not be able to devote a hand to carrying and operating a handheld scanner, particularly if two hands are necessary to position an item for scanning, maneuver a cart or other vehicle through the warehouse, operate other equipment, or otherwise safely perform other essential tasks. As such, a user may be forced to regularly put down the handheld scanner and risk misplacing or forgetting the scanner, or to attempt maneuvers that may place the user at risk for injury and/or the item or scanner at risk for damage. These challenges are compounded in situations where, in addition to a handheld scanner, a user must carry and use additional equipment to interpret the information derived from a scanned barcode.

To address these and other technical challenges, example embodiments of the invention disclosed herein involve the use of an augmented reality viewing system, such as a binocular augmented reality headset, for example, to render an image of a barcode scanner in the field of view of the user and, through the operation of a camera integrated into and/or otherwise associated with the augmented reality viewing system, capture the image of a barcode located on a target object within the field of view of the user.

In a first example embodiment, a method is provided for capturing a barcode image within an augmented reality environment. The method may include detecting a target object within a field of view of an augmented reality viewing device, such as, but not limited to, a binocular augmented reality headset. The method may further include rendering an image of a scanning device within the field of view of the augmented reality viewing device. Further, the method may include rendering a scanning area within the field of view of the augmented reality viewing device. In some embodiments, the augmented reality viewing device may have a camera associated with the augmented reality viewing device. In such embodiments, the method may include capturing an image of a barcode located on the target object by the camera associated with the augmented reality viewing device.

In some embodiments, rendering the image of the scanning device, as described above, may include rendering a three-dimensional image of the scanning device.

In some embodiments, rendering the scanning area within the field of view of the augmented reality viewing device, as described above, may include rendering a representation of an active read area of the camera associated with the augmented reality viewing device. Further, the method may further include rendering the representation of the active read area of the camera in a first color. The method may further include determining if the target object is located within the active read area of the camera, and based, at least in part on determining that the target object is located within the active read area of the camera, rendering the representation of the active read area of the camera in a second color.

In some embodiments, capturing the image of the barcode, as described above, may include removing the image of the scanning device from the field of view. Additionally or alternatively, capturing the image of the barcode may cause an audible sound to be emitted from the augmented reality viewing device.

In a further embodiment, the augmented reality viewing device may include a binocular augmented reality headset.

In another example embodiment, an apparatus is provided for capturing a barcode image within an augmented reality environment. The apparatus may include a processor for detecting a target object within a field of view of the apparatus. The processor may render an image of a scanning device within the field of view of the apparatus. Further, the processor may render a scanning area within the field of view of the apparatus. In some embodiments, the apparatus may have a camera associated with apparatus. In such embodiments, the processor may cause the camera to capture an image of a barcode located on a target object.

In some embodiments, rendering the image of the scanning device, as described above, may include rendering a three-dimensional image of the scanning device.

In some embodiments, rendering the scanning area within the field of view of the apparatus, as described above, may include rendering a representation of an active read area of the camera associated with the apparatus. Further, the processor may render the representation of the active read area of the camera in a first color. The processor may further determine if the target object is located within the active read area of the camera, and, based at least in part on determining that the target object is located within the active read area of the camera, may render the representation of the active read area of the camera in a second color.

In some embodiments, capturing the image of the barcode, as described above, may include removing the image of the scanning device from the field of view. Additionally or alternatively, capturing the image of the barcode may cause an audible sound to be emitted from the apparatus.

In another example embodiment, a computer program product having non-transitory computer-readable storage medium is provided. The non-transitory computer-readable storage medium includes computer-executable program code stored therein. Further, the computer-executable program code may include program code instructions for capturing a barcode image within an augmented reality environment. The computer program product may include program code instructions to detect a target object within a field of view of the augmented reality viewing device. The computer program product may further include program code instructions to render an image of a scanning device within the field of view of the augmented reality viewing device, render a scanning area within the field of view of the augmented reality viewing device, and capture, by a camera associated with the augmented reality viewing device, an image of a barcode located on a target object.

In some embodiments, the computer program product may further include program code instructions to render a three-dimensional image of the scanning device.

In some embodiments, the computer program product may further include program code instructions to render a representation of an active read area of the camera associated with the augmented reality viewing device. Further, the computer program product may include program code instructions to render the representation of the active read area of the camera in a first color, determine if the target object is located within the active read area of the camera, and, based at least in part on determining that the target object is located within the active read area of the camera, render the representation of the active read area of the camera in a second color.

In some embodiments, the computer program product may include program code instructions to removing the image of the scanning device from the field of view on capturing the image of the barcode. Additionally or alternatively, the computer program product may include program code instructions to cause an audible sound to be emitted from the apparatus on capturing the image of the barcode.

In yet another embodiment, a system for capturing a barcode image within an augmented reality environment is provided. The system may include an augmented reality viewing device having a processor for detecting a target object within a field of view of the augmented reality viewing device. The processor may render an image of a scanning device within the field of view of the augmented reality viewing device. Further, the processor may render a scanning area within the field of view of the augmented reality viewing device. In some embodiments, the system may include a camera associated with the augmented reality viewing device. In such embodiments, the camera may capture an image of a barcode located on a target object.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings, which are not necessarily drawn to scale.

DETAILED DESCRIPTION

Figure 1:
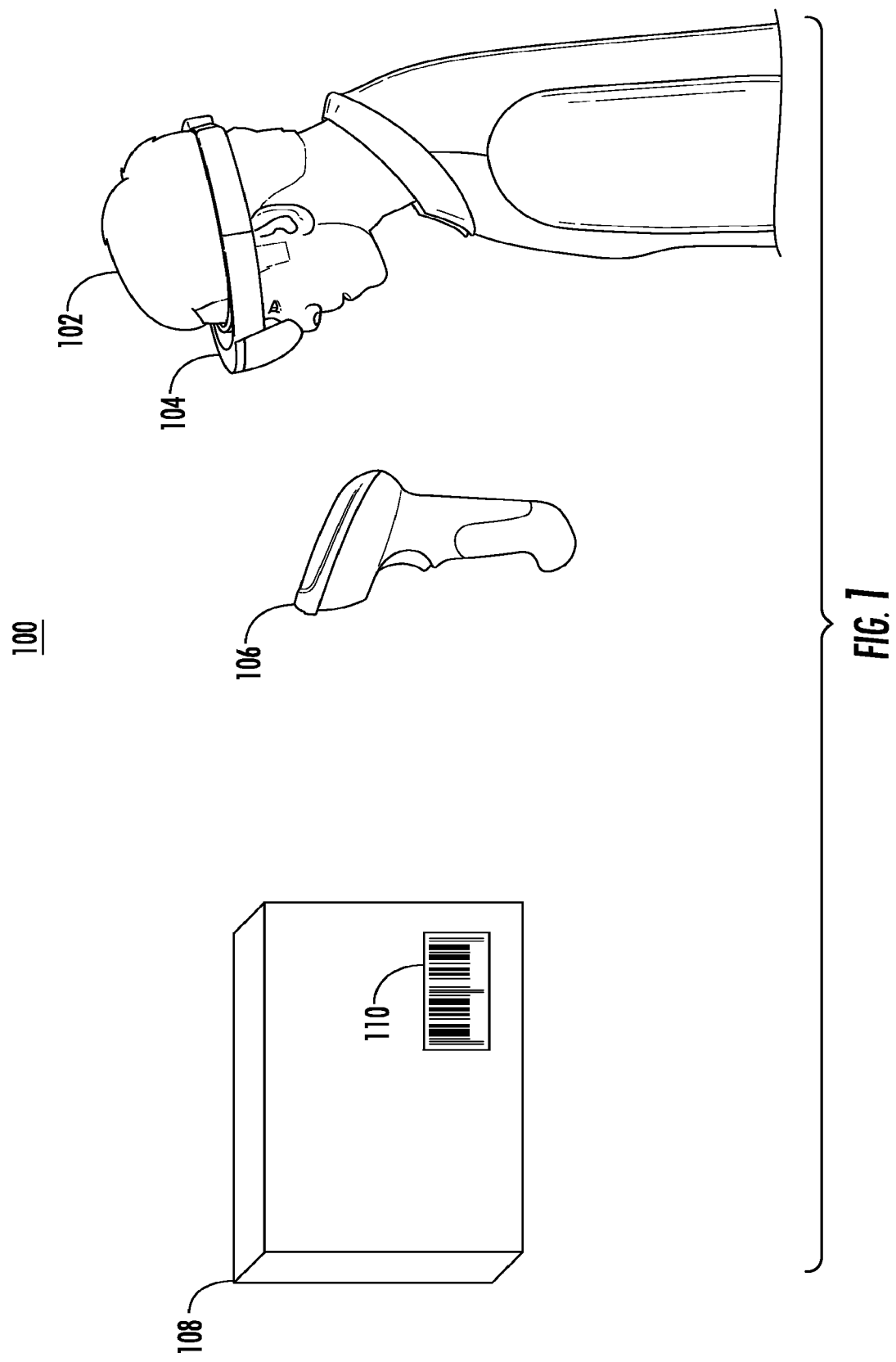
FIG. 1 is a system diagram illustrating aspects of an example implementation an example embodiment described herein.

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention.

The word "exemplary," when used herein, is intended to mean "serving as an example, instance, or illustration." Any implementation described herein as "exemplary" is not necessarily preferred or advantageous over other implementations.

The term "augmented reality" is used herein to refer to a composite view presented to a view that includes generated images and/or text that are superimposed on the user's view of the existing environment. In this regard, some augmented reality implementations include, but are not limited to, the superimposition or other application of generated text and/or images onto a live video stream captured by a camera that is aligned with a user's field of view. Some augmented reality implementation include, but are not limited to, the superimposition of text or images on a display that allows the user to simultaneously view the superimposed content and the surrounding environment. The term "augmented reality viewing device" is used herein to refer to any device configured to present augmented reality content to a user. For example, the Microsoft Hololens head-mounted viewing device is an example of an augmented reality viewing device that is capable of superimposing images and/or text onto displays placed in front of each of a viewer's eyes. It will be appreciated that a mobile device, such as a smart phone or tablet computer, for example, may also be configured to present augmented reality content to a user.

The term "scanning device" is used herein to refer to any device capable of scanning a barcode or similar image. As described herein, some example implementations of embodiments of the invention involve rendering, in an augmented reality environment, an image of a scanning device. In some of the example implementations presented herein, the scanning device is a handheld barcode scanner. However it will be appreciated that the term "scanning device" encompasses any device capable of scanning a barcode. Moreover in example implementations involving the rendering and/or presentation of an image of a scanning device, the image of the scanning device need not duplicate the exact appearance of any particular scanning device, and may, for example, present a generic scanning device and/or incorporate design elements and/or other image aspects that are not present on any physically existing scanning device.

The term "target object" is used herein to refer to any object, item, article, surface, or the like, placed in a field of view of a scanning device to be scanned. As described herein, in some example implementations of embodiments of the invention, the target object has an encoded indicia, such as a barcode for example, located on the target object. In this regard, the scanning device may capture an image of the barcode located on the target object. By way of an example arising in a retail and/or a warehouse environment, inventory may be tracked by scanning a decodable indicia, such as a barcode placed on each item in the retail store and/or the warehouse. In this regard, each item that includes a decodable indicia in a field of view of a scanning device may be referred to as a "target object" for the scanning device.

Overview

The present disclosure relates to methods, apparatuses, and computer program products for capturing a barcode image within an augmented reality environment. Many environments involve the use, detection, and scanning of decodable indicia, such as barcode images, for inventory management and/or tracking. As such, a handheld scanning device may be operated by a user to read or otherwise capture the barcode image and convey the barcode image information to a system capable of decoding and/or otherwise processing the barcode image information. However, in some scenarios, such as a warehouse environment, a user may not be able to devote a hand to carrying and operating a handheld scanner, particularly if two hands are necessary to position an item for scanning, maneuver a cart or other vehicle through the warehouse, operate other equipment, or otherwise safely perform other essential tasks. Thus, in such scenarios, it may be desirable to use a wearable device, such as a headset, and more specifically, an augmented reality viewing device, to read and/or capture images of decodable indicia, such as barcodes, while allowing the user to use both hands to perform other essential tasks safely.

Some example implementations of embodiments of the invention involve the use of an augmented reality viewing device that is fitted with a camera and/or other image scanner capable of capturing a barcode image. Such example implementations contemplate using the augmented reality viewing device to replace a handheld scanner or other similar scanning device, freeing the user to use two hands to manipulate, move, and/or otherwise handle target objects. In this regard, the augmented reality viewing device, which may be configured as a head-mounted device, may detect a target object when the target object is located within a field of view of the camera and/or other image scanner incorporated into the augmented reality viewing device. In some embodiments, the target object may include a decodable indicia, such as a barcode, located on a surface of the target object. One of the technical challenges associated with using a head-mounted display or other augmented reality viewing device to assist in the capture of a barcode or other decodable indicia is the difficulty in rapidly aligning the target object within the camera in a manner that allows for the camera to readily capture the barcode image on the target object. Other technical challenges arise in easing the interface between the human user and the head-mounted display or other augmented reality device, particularly in situations where a user has grown accustomed to using a handheld scanner to capture barcode images.

To address these and other technical challenges, the augmented reality viewing device may generate and present an image of a scanning device to a user via the display of the augmented reality viewing device. In some example implementations, the image of the scanning device is superimposed on the view presented to the user. By presenting an image and/or representation of a traditional scanning device in the view presented to a viewer, the user may more readily adapt to the use of the augmented reality viewing device, align the target object with the scanning area of the camera associated with the augmented reality viewing device, and otherwise use the augmented reality viewing device to perform the image capture and/or barcode scanning operations necessary in a given environment. In some example implementations, a three-dimensional image of a scanning device may be presented in a field of view of the user. It will be appreciated that depiction of the scanning device (including but not limited to a three-dimensional image of the scanning device) need not duplicate the exact appearance of any particular scanning device. For example, some example implementations involve the presentation of a generic scanning device and/or and image of a scanning device that incorporates design elements and/or other image aspects that are not present on any physically existing scanning device.

In such example implementations, and regardless of the precise appearance of the image of a scanning device rendered in the view presented to the user, the user is provided with a scanning aid in the field of view of the user for scanning decodable indicia, such as a barcode, located on the target object. For example, with respect to rendering a three-dimensional image of a handheld scanner within the field of view of a user, some example implementations of the invention provide a user with a frame of reference in the form a familiar tool, while eliminating the need for the user to physically handle and manipulate the scanner during operations that may require two hands to perform safely.

In some example implementations, the augmented reality viewing device may render, in the view presented to a user, a depiction of a scanning area of the augmented reality viewing device. In some such example implementations, the scanning area may be presented in the form of a tinted or otherwise colored region superimposed on the view presented to the user. In some other example implementations, the scanning area may be rendered or otherwise presented in the form of a three-dimensional conical representation of a scan area of the augmented reality viewing device. Some example implementations allow for visual feedback to be provided to the user based on the movement of a target object in and/or around the scanning area of the augmented reality viewing device. In some example implementations, the augmented reality viewing device may render the scanning area as a region presented in a first color. In such example implementations, the user may be able to determine whether a target object (and particularly, a barcode image on a target object) is within the scanning area by visually determining whether the target object is within the colored region rendered in the view presented to the user.

In some further example implementations, the augmented reality viewing device may detect if a target object and/or a decodable indicia, such as a barcode, is located within the scanning area, and may re-render the scanning area in a second color. In such example implementations, the presence of a target object within the scanning area causes a switch in the color used to render the scanning area. In other example implementations, the scanning area may be presented in one color when no target object is present in the scanning area, a second color when a target object is determined to be positioned in the scanning area, and a third color when an image of the target object and/or a decodable indicia is captured. Thus, the scanning area may be rendered in various colors and/or other appearances in order to assist a user operating the augmented reality viewing device for scanning a barcode located on a target object to place the barcode and/or the target object within a scan range and/or a read area of the camera associated with the augmented reality viewing device. This enables the user to rapidly and intuitively align the active scanning area of the augmented reality viewing device, such as a head-mounted device, so that the user can efficiently locate and scan images of a barcode without needing to manipulate a physical scanner.

Figure 2:
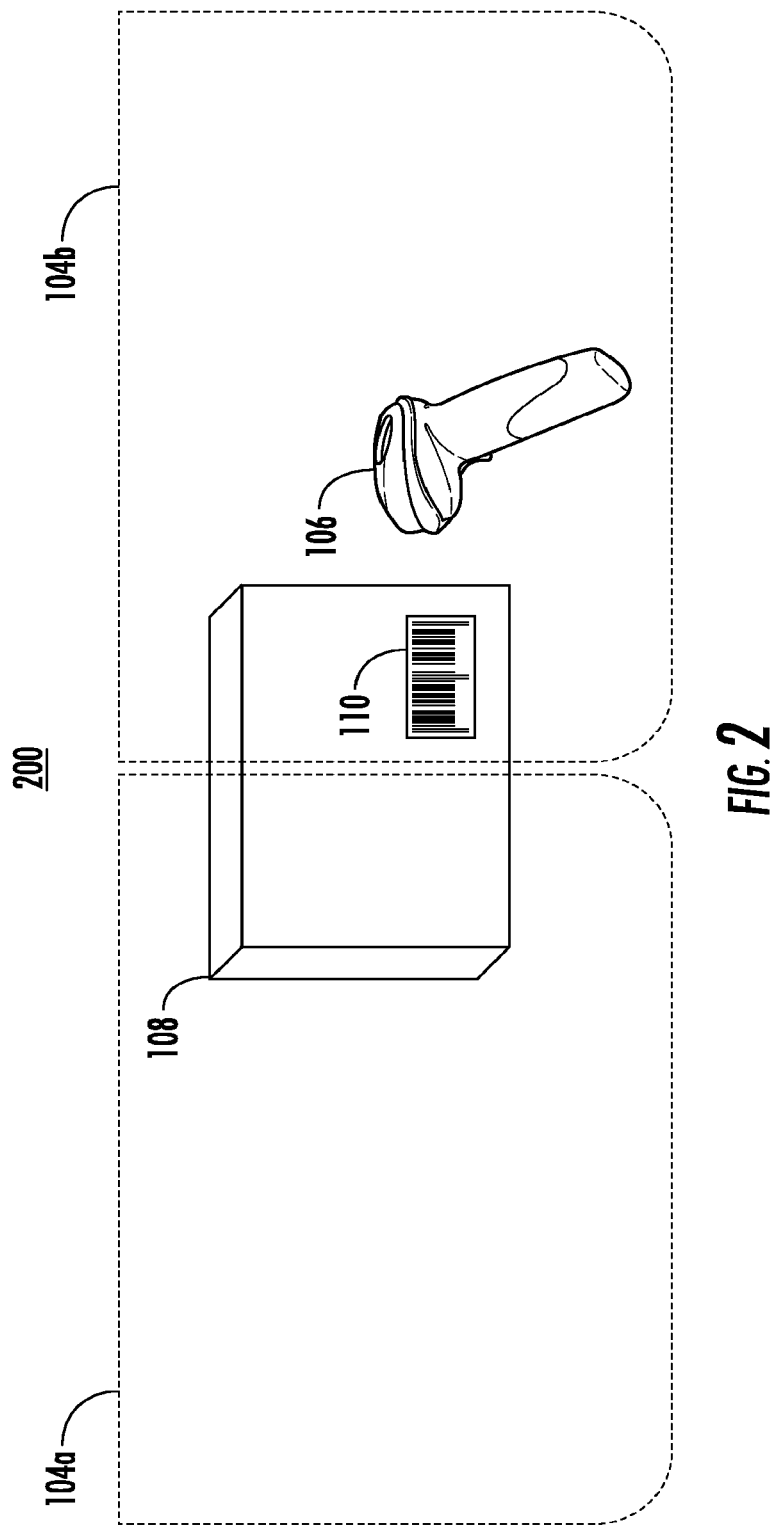
FIG. 2 is an illustration of an example view that may be presented to a user in accordance with an example implementation of an example embodiment described herein.
Figure 3:
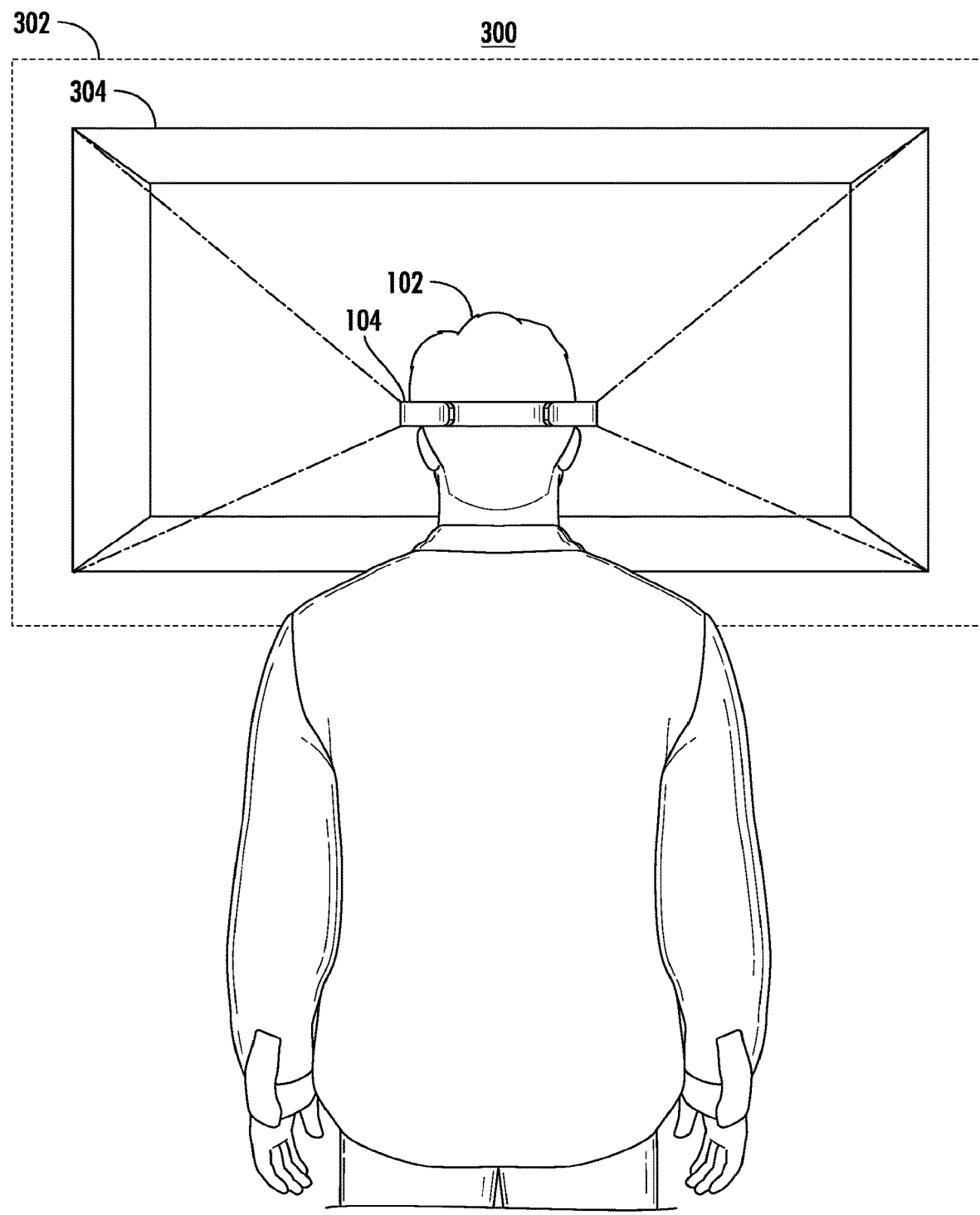
FIG. 3 is a schematic block diagram illustrating aspects of an example implementation in accordance with an example embodiment described herein.

Turning to the FIGS. 1-3, it will be appreciated that the components illustrated in the figures represent components that may or may not be present in various embodiments of the invention described herein such that embodiments may include fewer or more components than those shown in the figures while not departing from the scope of the invention.

While the present disclosure focuses on barcode scanning applications in an augmented reality environment, one or more embodiments of the present disclosure may be used for other purposes or in other environments, such as to capture an image of a target object in a virtual and/or augmented reality environment. The present disclosure may also be beneficial in any environment where it may be desired to provide an indication of a viewing area of a device, such as a camera, to serve as an aid for a user to position a target object in the viewing area for efficient and quick processing, such as image capturing.

FIG. 1 shows an example system 100 illustrating aspects of an example implementation of an embodiment of the invention. FIG. 1 generally depicts a relationship between a user 102, an augmented reality viewing device 104, a rendered image of a scanning device 106, and a target object 108 having a decodable indicia, such as a barcode 110. In some example implementations, the augmented reality viewing device 104 is capable of superimposing images and/or text onto displays placed in front of each of a viewer's eyes, such as, but not limited to, a smart phone, an eyeglass, a head gear, or the like. In the example implementation shown in FIG. 1, the augmented reality viewing device 104 is in the form of a head-mounted device. Some such implementations may involve the use of head-mounted devices such as the Microsoft Hololens device. In particular, some example implementations contemplate the augmented reality viewing device 104 is constructed as to feature a binocular arrangement that is capable of presenting different views to each eye of the user 102. In some such binocular viewer arrangements, the augmented reality viewing device 104 is able to generate and use parallax effects that result from differing images being presented to each eye of the user 102, such that the user 102 perceives a three-dimensional image of a scanning device 106, a scanning area, and/or other image. In some example implementations, such as the implementation shown in FIG. 1, the rendered image of the scanning device 106 may be perceived by the user 102 as being located in front of the user 102 and in the user 102's field of view.

It will be appreciated that while the image of a scanning device 106 is shown in FIG. 1 as a particular type of handheld scanning device, the image of a scanning device 106 need not be limited to a three-dimensional image of a scanning device. Instead, the image 106 may take on a broad range of appearances, such as that of existing scanning devices, images that are recognizable as scanning-type devices, and/or other image capturing devices, for example. Further, the image of a scanning device 106 may include additional features, such as a handle, for a user to adjust a position and/or orientation of the image of the scanning device. In some example implementations, the augmented reality viewing device 104 may render additional images and/or text along with the image of a scanning device 106 to provide additional information to the user. For example, the augmented reality viewing device 104 may render an arrow near the image of a scanning device 106 indicating the user to move the target object in the direction indicated by the arrow so as to bring the target object within the field of view of the augmented reality viewing device and/or an associated camera.

Further, a rendering position, location, and/or orientation of the image of the scanning device may be predetermined relative to the user and/or the augmented reality viewing device. The predetermined location may be stored in a memory of the augmented reality viewing device and/or may be accessible to the augmented reality viewing device from a server and/or a cloud. In other embodiments, a rendering position, location, and/or orientation of the image of the scanning device 106 may be determined in real time and/or near real time by the augmented reality viewing device and/or any associated circuitry. In an example implementation, the rendered image of the scanning device 106 may be positioned in an active read and/or scan area of the augmented reality viewing device 104. Further, the rendered image of the scanning device 106 may be dynamically moved within the field of view of the user. For example, the image of the scanning device 106 may be rendered in one location while the user is moving, and/or in another location when a scannable image is detected in or near the read area of the camera.

By way of an example, augmented reality viewing device 104 may include a camera for capturing an image of a target object. The camera may have an associated field of view such that placing the target object in the field of view of the camera may enable the camera to capture an image of the target more efficiently and readily. In some embodiments, the augmented reality viewing device 104 and/or an associated camera may have a region within their field of view where one or more image capturing parameters may be optimal. For example, in a specific area, referred to as active read and/or scan area of the augmented reality viewing device 104 and/or the camera, image capturing parameters, including but not limited to, focus, brightness, exposure, and the like may be optimal and/or close to optimal and/or otherwise suitable for capturing a barcode image or the like.

In accordance with some example implementations of embodiments of the invention, the user 102 may view a rendered image of the scanning device 106 in the user 102's field of view. In order to capture an image of the target object 108 and/or barcode 110, the user 102 may use the rendered image of the scanning device 106 as an image capturing aid indicating an active scan and/or read area within the field of view of the augmented reality viewing device 104. The user 102 may intuitively position the target object 108 having the barcode 110 in front of the rendered image of the scanning device 106. In some example implementations, the user 102 may hold the target object 108 in his/her hand and may position the target object 108 in front of the rendered image of the scanning device 106, in other embodiments, where the augmented reality viewing device 104 may be a wearable device, such as a head-mounted device, the user 102 may move his/her head to move the rendered image of the scanning device 106, while the target object 108 may be stationary and/or fixed. In this regard, the user 102 may move and position the rendered image of the scanning device 106 in front of the target object 108 and/or the barcode 110, thus moving the field of view and/or an active read or scan area of the augmented reality viewing device 104 and/or an associated camera to align the field of view and/or an active read or scan area with the target object 108 and/or the barcode 110.

Further, the augmented reality viewing device 104 and/or an associated camera may detect that a target object 108 and/or the barcode 110 is located within the field of view of the augmented reality viewing device 104 and/or the associated camera, and may capture an image of the target object 108. In some example implementations, capturing the image of the barcode 110, may cause the augmented reality viewing device to remove the rendered image of the scanning device 106 from the field of view of the user 102. The image of the target object 108 may further be processed by the augmented reality viewing device 104 and/or an associated processing system to decode the barcode 110. The decoded data may be utilized by the augmented reality viewing device 104, a server, and/or other associated devices for various purposes, such as, inventory management, shipment tracking, retail checkout and billing, and the like.

FIG. 2 shows an example view 200 that may be presented to a user in accordance with an example implementation of an embodiment of the invention described herein. FIG. 2 illustrates a view seen through an augmented reality viewing device 104, such as a binocular augmented reality device, as described with reference to FIG. 1. FIG. 2 shows a left eye view 104a presented to a left eye of the user 102 and a right eye view 104b presented to a right eye of the user 102. As described above, by presenting a different view to each eye of the user 102, a parallax effect may be created and may cause the user 102 to perceive a superimposed, three-dimensional image of a rendered scanning aid, such as the rendered image of a scanning device 106, as shown in FIG. 1-2.

In accordance with an example implementation, and as shown in FIG. 2, the left eye view 104a may include a portion of the target object 108. Further, the right eye view 104b may include the rest of the portion of the target object 108, the barcode 110, and a rendered image of the scanning device 106. Thus, a parallax effect may be created and the user may perceive the rendered image of the scanning device 106 positioned at a distance in front of the user 102 within the user 102's field of view, as shown in FIG. 1. While FIG. 2 depicts the rendered image of a scanning device 106 as being presented such that a user 102 would perceive it as being located in the space in front of the user 102's right eye, it will be appreciated that images may be presented to the user 102 via views 104a and 104b such that the user 102 may perceive the location of the rendered image of the scanning device 106 in any location within the available field of view.

FIG. 3 shows a schematic block diagram 300 illustrating aspects of an example implementation of an embodiment of the invention described herein. FIG. 3 illustrates an example depiction of an implementation involving presenting a scanning area 304 to a user 102 within a user 102's field of view 302. In some example implementations, the scanning area 304 may be rendered as a three-dimensional depiction of a scanning area of a camera associated with the augmented reality viewing device 104. In some such example implementations, the scanning area 304 may depict an active read and/or scan area of the augmented reality viewing device 104 as perceived from the perspective of the user. As discussed above, the augmented reality viewing device 104 may include an associated camera and/or other scanning device for capturing an image of a target object. The camera may have an associated field of view such that placing the target in the field of view of the camera may enable the camera to capture an image of the target more accurately, efficiently, and/or readily. In some implementations, the scanning area 304 may represent a specific area within the field of view of the augmented reality viewing device 104 and/or an associated camera where one or more image capturing parameters, such as, focus, lighting, exposure, or the like, may be optimal and/or otherwise sufficient for capturing an image, such as a barcode image.

In some example implementations, the scanning area 304 may be rendered as a three-dimensional conical area expanding from the augmented reality viewing device 104 depicting a field of view of the camera associated with the augmented reality viewing device 104. Additionally or alternatively, the scanning area 304 may include a rendering of a representation of the active read area of the camera, as described above, in a first color. Further, the augmented reality viewing device 104 and/or the associated camera may detect if the target object 108 is located within the scanning area 304. If the target object 108 and/or the barcode 110 is determined to be located within the scanning area 304, the augmented reality viewing device 104 may render the representation of the active read area of the camera in a second color. By way of an example, the scanning area 304 may be rendered as a three-dimensional area of red color within the field of view 302 of the user 102 depicting the active read area of the camera associated with the augmented reality viewing device 104. The user 102 may bring a target object, such as the target object 108 having a barcode 110 shown in FIGS. 1-2, within the scanning area 304 to scan and read the barcode 110. Once the augmented reality viewing device 104 and/or the associated camera detects that the target object 108 and/or the barcode 110 is within the scanning area 304, the augmented reality viewing device 104 may render the scanning area 304 in a green color, by way of an example.

Any approach to detecting a target object 108 within the scanning area 304 of the augmented reality viewing device 104 may be used, including but not limited to depth sensing, infrared (IR) imaging, laser, thermal imaging, image recognition protocols, or the like. In some example implementations, the augmented reality viewing device 104 may detect a target object within a field of view of the augmented reality viewing device 104 by viewing and identifying a marker, such as a barcode located on the target object for example. In other implementations, the augmented reality viewing device 104 and/or an associated camera may compare an image of the object within the field of view of the augmented reality viewing device 104 against a target object database for identifying if the object is a target object.

By way of another example, the scanning area 304 may be presented in one color when no item is present in the scanning area 304, a second color when a target object 108 is determined to be positioned in the scanning area 304, and a third color when an image of the target object 108 and/or the barcode 110 is captured. In another example implementation, the change in color of the scanning area 304 may be gradual, relative to the area of the target object 108 and/or the barcode 110 within the scanning area 304. By way of the above example, the color of the scanning area 304 may gradually change from red, to a different saturation of red, to a specific saturation of green, to green as the target object 108 and/or the barcode 110 is brought within the scanning area 304.

It should be noted that though the above description focuses on changing a color of the scanning area 304 as an indication to a user 102 that the target object 108 is positioned within the scanning area 304, the indication is not limited to just changing the color of the scanning area 304. The indication may be provided by changing any graphical characteristic of the scanning area 304, such as, but not limited to, line style, brightness, etc. In other example implementations, the indication may be provided as an alert on a display of the augmented reality viewing device 104. In further embodiments, the indication may be provided as a sound alert, such as a beep, generated by the augmented reality viewing device 104 and/or any other associated device.

In some example implementations, when the object 108 and/or the barcode 110 is detected as being located within the scanning area 304 by the augmented reality viewing device 104, an image of the target object 108 and/or the barcode 110 may be captured by the camera associated with the augmented reality viewing device 104. In some example implementations, the image of the barcode 110 may be captured by the augmented reality viewing device 104 and/or the camera associated with the augmented reality viewing device 104. In some other example implementations, the image of the target object 108 may be captured by the augmented reality viewing device 104 and/or the camera associated with the augmented reality viewing device 104, and may be processed to obtain details and/or other data from the barcode 110. In some such example implementations, the image of the barcode 110 may be processed by the augmented reality viewing device 104 to decode the barcode, or the image of the barcode 110 or the target object 108 may be sent to a server and/or any associated device for processing.

Further, in some example implementations, capturing the image of the target object 108 and/or the barcode 110 may further cause an alert, such as an audible sound to be generated by the augmented reality viewing device 104 and/or any other associated device.

The design of the various devices performing various example operations is provided below.

System Architecture

Methods, apparatuses, and computer program products of the present invention may be embodied by any of a variety of devices. Example embodiments may include a plurality of devices operating a part of an augmented reality viewing system.

Figure 4:
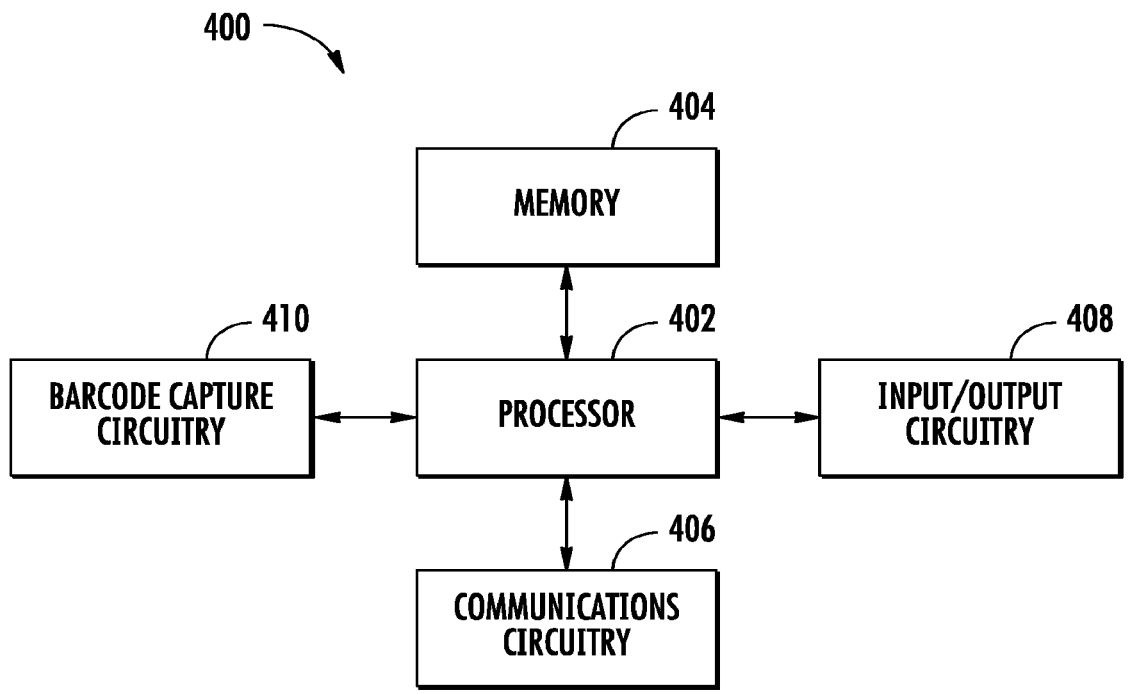
FIG. 4 is a schematic block diagram of an example apparatus and related circuitry embodying an augmented reality viewing device that may perform operations in accordance with some example embodiments described herein.

Turning to FIG. 4, an example apparatus 400 is illustrated that may represent a basic set of components of a device embodying an example augmented reality viewing device 104. The apparatus 400 may include a processor 402, a memory 404, and communications circuitry 406. The device may further include input/output circuitry 408 for capturing images, presenting text and/or images to a viewer in an augmented reality environment, and/or otherwise interacting with a user, and barcode capture circuitry 410 for recognizing and capturing barcodes and/or other scannable images in the scanning area of a camera or other scanning device incorporated into the augmented reality viewing device 104. The apparatus 400 may be configured to execute the operations described below in connection with FIG. 5. Although these components 402-410 are described with some functional descriptors, it should be understood that the particular implementations necessarily include the use of particular hardware. It should also be understood that certain of these components 402-410 may include similar or common hardware. For example, the barcode capture circuitry 410 may leverage use of the processor 402, memory 404, communications circuitry 406, and/or input/output circuitry 408 to perform their associated functions, and duplicate hardware is not required for the distinct components of the apparatus 400 (although embodiments using duplicated hardware are also contemplated herein). The use of the term "circuitry" as used herein with respect to components of the apparatus therefore includes particular hardware configured to perform the functions associated with the particular circuitry described herein. Of course, while the term "circuitry" should be understood broadly to include hardware, in some embodiments, circuitry may also include software for configuring the hardware components of the apparatus 400.

In some embodiments, the processor 402 (and/or co-processor or any other processing circuitry assisting or otherwise associated with the processor) may be in communication with the memory 404 via a bus for passing information among components of the apparatus. The processor 402 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 402 may be configured to execute instructions stored in the memory 404 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the memory 404 may be non-transitory and may include, for example, one or more volatile and/or non-volatile memories. In other words, for example, the memory may be an electronic storage device (e.g., a computer readable storage medium). The memory 404 may be configured to store information, data, content, applications, instructions, or the like, for enabling the apparatus to carry out various functions in accordance with example embodiments contemplated herein.

The communications circuitry 406 may be any means such as a device or circuitry embodied in either hardware or a combination of hardware and software that is configured to receive and/or transmit data from/to a network and/or any other device, circuitry, or module in communication with the apparatus 400. In this regard, the communications circuitry 406 may include, for example, a network interface for enabling communications with a wired or wireless communication network. For example, the communications circuitry 406 may include one or more network interface cards, antennae, buses, switches, routers, modems, and supporting hardware and/or software, or any other device suitable for enabling communications via a network. Additionally or alternatively, the communication interface 406 may include the circuitry for interacting with the antenna(s) to cause transmission of signals via the antenna(s) or to handle receipt of signals received via the antenna(s). These signals may be transmitted by the apparatus 400 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX), or other proximity-based communications protocols.

In some embodiments, the apparatus 400 may include input/output circuitry 408 that may, in turn, be in communication with processor 402 to provide output to a user and, in some embodiments, to receive an indication of user input. In many of the example implementations described and/or otherwise contemplated herein, the input/output circuitry 408 will be involved with the output of augmented reality content to a display or other output device incorporated into the augmented reality viewing device 104. For example, the input/output circuitry may interface with one or more displays (such as the binocular viewing arrangement in the Microsoft Hololens device, for example) to present a rendered image of a scanning device to a user. The input/output circuitry 408 may comprise a user interface and may include a display that may include a web user interface, a mobile application, a client device, or the like. In some embodiments, the input/output circuitry 408 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 404, and/or the like).

In addition, the apparatus 400 also comprises barcode capture circuitry 410, which includes hardware components designed to manage the recognition, capture, and/or decoding of a barcode presented to the augmented reality viewing device 108. Barcode capture circuitry 410 may utilize processor 402, memory 404, or other hardware component included in the apparatus 400 to perform these functions. Barcode capture circuitry 410 may further utilize communications circuitry 406 to transmit and/or receive data from a variety of data sources.

It should be appreciated that, in some embodiments, barcode capture circuitry 410 may include a separate processor, specially configured field programmable gate array (FPGA), or application specific interface circuit (ASIC) to perform the above-described functions. Barcode capture circuitry 410 is therefore implemented using hardware components of the apparatus configured by either hardware or software for implementing these planned functions. In some example implementation, barcode capture circuitry 410 may (either directly or through the user of processor 402, memory 404, communications circuitry 406, and/or input/output circuitry 408) interact with other systems and/or processes, including but not limited to those associated with Honeywell's SwittDecoder software.

As described above and as will be appreciated based on this disclosure, example embodiments may be implemented by a plurality of devices, such as fixed devices, mobile devices, backend network devices, and/or the like. Accordingly, embodiments may comprise various means including entirely of hardware or combination of hardware with software. Furthermore, embodiments may take the form of a computer program product stored on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

It should be appreciated, with respect to certain devices embodied by apparatus 400, as described in FIG. 4 computer program instructions and/or other type of code may be loaded onto a computer, processor or other programmable apparatus's circuitry to produce a machine, such that the computer, processor other programmable circuitry that execute the code on the machine create the means for implementing various functions described herein.

Having described specific components of example devices (e.g., apparatus 400) that may carry out some of the functionality of the system described herein, example implementations of embodiments of the present invention are described below in connection with a series of flowcharts.
Operations Performed by an Augmented Reality Viewing Device Turning to FIG. 5, a flowchart is illustrated that contains operations performed by a augmented reality viewing device to present a rendered image of a scanning device to a user within an augmented reality environment and capture a barcode on a target item. The operations illustrated in FIG. 5 may, for example, be performed by, with the assistance of, and/or under the control of an apparatus 400 which in turn may be a component of an augmented reality viewing device (e.g., augmented reality viewing device 104), and more particularly through the use of one or more of processor 402, memory 404, communications circuitry 406, input/output circuitry 408, and barcode capture circuitry 410.

Turning first to operation 502, the apparatus 400 may include means, such as processor 402, input/output circuitry 408, barcode capture circuitry 410, or the like for detecting a target object within a field of view of an augmented reality viewing device 104. As described above, the term "target object" as used herein may refer to any object, item, article, surface, etc., placed in a field of view of a scanning device for scanning. In some example implementations, the target object may have an encoded indicia, such as a barcode for example, located on the target object. With reference to operation 502, in an example implementation, the augmented reality viewing device 104 may detect a target object comprising a barcode within a field of view of the augmented reality viewing device 104. In this regard, the augmented reality viewing device 104 may include and/or incorporate a camera and/or other scanning device, for viewing and identifying a marker, such as a barcode and/or other indicator located on an object. The augmented reality viewing device 104 may identify the object with a marker as a target object. In some example implementations, the augmented reality viewing device 104 and/or an associated camera may compare an image of an object within the field of view of the augmented reality viewing device 104 against a target object database for identifying if the object is a target object. For example, the target object database may be stored in the memory 404 of the apparatus 400. The target object database may be configured by a user and/or a manufacturer and may be updated regularly by the user and/or a server. In another example implementation, the target object database may be accessible by the augmented reality viewing device 104 via communication between the augmented reality viewing device 104 and other systems, such as but not limited to, a server and/or a cloud.

Further, the augmented reality viewing device 104 may be configured to detect a barcode image within the field of view of the augmented reality viewing device 104, by identifying known patterns, such as a pattern of light and dark lines, rectangles, dots, hexagons and other geometric patterns in two dimensions, or the like. In some example implementations, the augmented reality viewing device 104 may comprise a wide angle detection camera for detecting an object within a field of the augmented reality viewing device 104, and a narrow angle detection camera for analyzing one or parameters associated with the object, to determine if the object may be identified as a target object. It should be noted that the example embodiments above are not limiting, and any other object detection method, including but not limited to depth sensing, infrared (IR) imaging, laser, thermal imaging, and the like, may alternatively and/or additionally be used to detect a target object within a field of view of an augmented reality viewing device 104.

Turning next to operation 504, the apparatus 400 may include means, such as processor 402, memory 404, communications circuitry 406, input/output circuitry 408, barcode capture circuitry 410, or the like, for rendering an image of a scanning device within the field of view of the augmented reality viewing device 104. As described above, with reference to FIG. 1-2, an image of a scanning device 106 may be rendered within a field of view of the augmented reality viewing device 104. In order to capture an image of a target object 108, the user 102 may use the rendered image of the scanning device 106 as an image capturing aid indicating an active scan and/or read area within the field of view of the augmented reality viewing device 104. The user 102 may intuitively position the target object 108 having a barcode 110 in front of the rendered image of the scanning device 106. In an example implementation, with reference to operation 504, the image of the scanning device may be rendered as a combination of right-eye and left-eye augmented reality images rendered on right-eye and left-eye displays of the augmented reality viewing device 104. In other embodiments, the image of the scanning device may be rendered using any known three-dimensional imaging technology, such as, but not limited to, polarized shutter technology, auto stereoscopy, holograms, and the like. In an example implementation, the augmented reality viewing device 104 may comprise an autostereoscopic display. In this regard, the autostereoscopic display may render left and right images to the left and right eyes of a user using any of a number of techniques including, but not limited to, a parallax barrier, a lenticular lens, a micro lens, and the like.

Further, the processor 402, memory 404, communications circuitry 406, input/output circuitry 408, barcode capture circuitry 410, or the like, may render the image of the scanning device at a specific location within the field of view of the augmented reality viewing device 104. In some example implementations, a rendering location of the image of the scanning device may be determined based on an active scan and/or read area of the augmented reality viewing device 104. Specifically, the processor 402 and/or a rendering engine of the augmented reality viewing device 104 may determine an area within the field of view of the augmented reality viewing device 104 and/or an associated camera with optimal or close to optimal scanning and/or imaging capturing parameters, as the active scan and/or read area. The processor 402 and/or a rendering engine of the augmented reality viewing device 104 may position the rendered image of the scanning device 106 such that the rendered image of the scanning device 106 may point towards the active scan and/or read area of the augmented reality viewing device 104 and/or an associated camera. In some example implementations, a rendering position, location, and/or orientation of the image of the scanning device may be predetermined relative to the user and/or the augmented reality viewing device 104. The predetermined location may be stored in the memory 404 of the augmented reality viewing device 104 and/or may be accessible to the augmented reality viewing device 104 from a server and/or a cloud. In other embodiments, a rendering position, location, and/or orientation of the image of the scanning device may be determined in real time by the augmented reality viewing device 104 and/or any associated circuitry.

In some example implementations, the rendering position, location, and/or orientation of the image of the scanning device may change if the field of view of the augmented reality viewing device is altered. For example, if a user wearing a head-mounted device turns his/her head towards right, the field of view of the head-mounted device and/or an associated camera shifts to the right, and thus, the position and location of the image of the scanning device may also be moved accordingly. Thus, the image of the scanning device may be dynamically positioned within the field of view of the user such that it indicates the current scan and/or read area of the augmented reality viewing device 104 and/or associated camera. In other example implementations embodiments, the rendering position, location, and/or orientation of the image of the scanning device may be changed if the user moves the rendered scanning device through a gesture and/or a command based on his/her preference. Further, the augmented reality viewing device 104 and/or any associated circuitry may additionally determine one or more graphical characteristics associated with the image of the scanning device, such as, but not limited to, texture, color, size, etc., and may render the image of the scanning device accordingly. In some example implementations, the augmented reality viewing device 104 may facilitate a user 102 to modify or set the graphical characteristics associated with the image of the scanning device as per his or her preference. For example, the apparatus 400 may include means, such as the input/output circuitry 408 that may, in turn, be in communication with the processor 402 to receive an indication of user input to modify or set the graphical characteristics associated with the image of the scanning device.

Turning next to operation 506, the apparatus 400 may include means, such as processor 402, memory 404, communications circuitry 406, input/output circuitry 308, barcode capture circuitry 410, or the like, for rendering a scanning area within the field of view of the augmented reality viewing device. In an example implementation, a scanning area may be rendered along with and/or in place of the rendered image of the scanning device, as described above. The scanning area may be rendered depicting the active scan and/or read area of the augmented reality viewing device 104. In some example implementations, the scanning area may be rendered in front of the rendered image of the scanning device, depicting a sub-field of view of the scanning device within the field of view of the augmented reality viewing device 104. In other example implementations the scanning area may be rendered as a polygon, and/or as a three-dimensional conical area expanding from the augmented reality viewing device 104 depicting a field of view of a camera associated with the augmented reality viewing device 104. Further, the above description of rendering and/or positioning an image of the scanning device, with reference to operation 504, may apply to the rendering and/or positioning of the scanning area, with reference to operation 506. In some example implementations, the scanning area may be a three-dimensional depiction of a scanning area of a camera associated with the augmented reality viewing device 104 and may depict an active read and/or scan area of the augmented reality viewing device 104 as perceived from the perspective of the user. Thus, the scanning area may be positioned to depict a specific area within the field of view of the augmented reality viewing device 104 and/or an associated camera where one or more image capturing parameters, such as, but not limited to, focus, lighting, exposure, etc., may be optimal and/or otherwise sufficient for capturing an image, such as a barcode image.

Turning next to operation 508, the apparatus 400 may include means, such as processor 402, memory 404, communications circuitry 406, input/output circuitry 408, barcode capture circuitry 410, or the like, for capturing an image of a barcode located on the target object. In an embodiment, the image of the barcode located on the target object may be captured by a camera associated with the augmented reality viewing device 104. In accordance with some example implementations, the image of the barcode located on the target object may be captured by a high-resolution digital camera, a low-end PC camera, or a camera with any other suitable resolution, personal data assistants (PDAs), laptop computers, tablet computers, smart books, palm-top computers, personal computers, smartphone, headset, smartwatch, and similar electronic devices equipped with at least a camera. Further, the image of the barcode may be captured in a single frame, in multiple frames followed by image stitching, or using any other available image capturing and/or processing technique. In some example implementations, the image of the barcode located on the target object may be captured automatically by the camera associated with the augmented reality viewing device 104 when the target object is within the rendered scanning area. In other embodiments, the image capturing of the barcode may be triggered by a user action, such as holding the rendered scanning device and pressing a trigger, or performing a predetermined gesture designated for image capturing.

In some example implementations, once the image of the image of the barcode located on the target object is captured by the camera associated with the augmented reality viewing device 104, the processor 402 and/or the barcode capture circuitry 410 may process the barcode image. In some example implementations, the processor 402 and/or any associated circuitry may detect a presence of a barcode pattern in the barcode image. The processor 402 may then determine the location, the bounding shape and/or size of the barcode pattern. Further, the processor 402 may apply a decoder algorithm on an enclosed region comprising the barcode pattern to decode the information encoded by the barcode. The decoding algorithm may analyze the barcode pattern to identify a sequence of narrow and wide bars, spaces, etc. to be compared against a symbology character set and/or be read as a bit stream. The analyzed pattern may then be used to obtain any stored information associated with the barcode, such as, but not limited to, object details, dimensions, pricing information, linked network address, or the like. The decoded barcode pattern and/or the decoded information may be sent to the server and/or any associated devices by the augmented reality viewing device 104. In some example implementations, the augmented reality viewing device 104 may send the captured image of the target object and/or the barcode to a server and/or any associated device for processing and decoding the barcode. The augmented reality viewing device 104 may send a secure copy of the captured image. Further, the augmented reality viewing device 104 may perform a check to ensure that the image quality is sufficient for processing and/or decoding the barcode by other systems, or may receive a confirmation from the server and/or associated devices that the image is being processed and/or that the barcode is decoded. In an embodiment, the augmented reality viewing device 104 may receive decoded barcode information from the server and/or associated devices.

As described above, example embodiments of the present invention thus provide a wearable scanning device which provides an indication of a viewing area of the scanning device to serve as an aid for a user to position a target object in the viewing area for efficient and quick image capturing.

Figure 5:
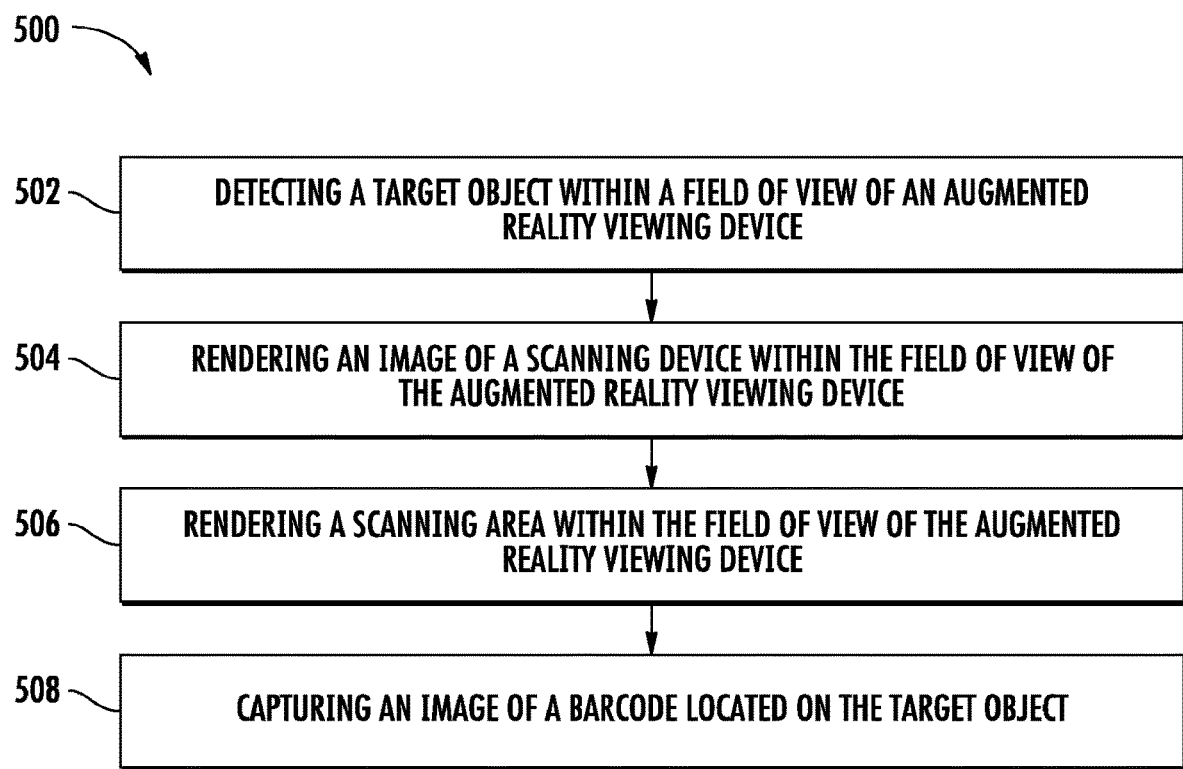
FIG. 5 illustrates a flowchart describing example operations performed by an augmented reality viewing device, in accordance with some example embodiments described herein.

FIG. 5 illustrates example flowchart describing operations performed in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions residing on a non-transitory computer-readable storage memory. In this regard, the computer program instructions which embody the procedures described above may be stored by a memory of an apparatus employing an embodiment of the present invention and executed by a processor of the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. When executed, the instructions stored in the computer-readable storage memory produce an article of manufacture configured to implement the various functions specified in flowchart blocks. Moreover, execution of a computer other processing circuitry to perform various functions converts the computer or other processing circuitry into a particular machine configured to perform an example embodiment of the present invention. Accordingly, the operations set forth in the flowcharts define one or more algorithms for configuring a computer or processor, to perform an example embodiment. In some cases, a general purpose computer may be provided with an instance of the processor which performs algorithms described in one or more flowcharts to transform the general purpose computer into a particular machine configured to perform an example embodiment.

Accordingly, the described flowchart blocks support combinations of means for performing the specified functions and combinations of operations for performing the specified functions. It will also be understood that one or more flowchart blocks, and combinations of flowchart blocks, can be implemented by special purpose hardware-based computer systems which perform the specified functions, or combinations of special purpose hardware that execute computer instructions.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order, Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively or in addition, some steps or methods may be performed by circuitry that is specific to a given function.

In one or more example embodiments, the functions described herein may be implemented by special-purpose hardware or a combination of hardware programmed by firmware or other software, in implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include RAM, ROM, EEPROM, FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. A method for capturing an image of a target object within an augmented reality environment, the method comprising:
   detecting, by a first camera, the target object within a field of view of a user of an augmented reality viewing device;
   analyzing, by a second camera, one or more parameters associated with the target object to identify that the object is the target object, wherein the first camera and the second camera are different;
   rendering a scanning area within the field of view of the user of the augmented reality viewing device, wherein rendering the scanning area comprises rendering a three-dimensional representation of an active read area in a first graphical characteristic of the scanning area;
   in response to determining that the target object is located within the active read area, rendering the three-dimensional representation of the active read area in a second graphical characteristic of the scanning area that is different from the first graphical characteristic; and
   in response to the target object being in the scanning area, capturing, by the second camera, the image of the target object.

2. The method of claim 1, further comprising: rendering a polygon representation of the active read area.

3. The method of claim 1, wherein the first camera is a wide angle detection camera for detecting the target object within the field of view of the user of the augmented reality viewing device.

4. The method of claim 1, wherein the second camera is a narrow angle detection camera for analyzing the one or more parameters associated with the target object.

5. The method of claim 1, further comprising: performing a predetermined gesture for capturing the image of the target object.

6. The method of claim 1, further comprising: in response to determining that the target object is not located within the active read area, rendering the three-dimensional representation of the active read area in a third graphical characteristic of the scanning area that is different from the first graphical characteristic and the second graphical characteristic.

7. The method of claim 1, wherein the augmented reality viewing device comprises a wearable device.

8. An apparatus for capturing an image of a target object within an augmented reality environment, the apparatus comprising a processor, wherein the processor is configured to:
   detect, by a first camera, the target object within a field of view of a user of the apparatus,
   analyze, by a second camera, one or more parameters associated with the target object to identify that the object is the target object, wherein the first camera and the second camera are different;
   render a scanning area within the field of view of the user of the apparatus, wherein the scanning area comprises a three-dimensional representation of an active read area in a first graphical characteristic of the scanning area;
   in response to determining that the target object is located within the active read area, render the three-dimensional representation of the active read area in a second graphical characteristic of the scanning area that is different from the first graphical characteristic; and
   in response to the target object being in the scanning area, cause the image of the target object to be captured by the second camera.

9. The apparatus of claim 8, wherein the processor is further configured to: render a polygon representation of the active read area.

10. The apparatus of claim 8, wherein the first camera is a wide angle detection camera for detecting the target object within the field of view of the user of the augmented reality viewing device.

11. The apparatus of claim 8, wherein the second camera is a narrow angle detection camera for analyzing the one or more parameters associated with the target object.

12. The apparatus or claim 8, wherein the processor is further configured to: render a three-dimensional image of a scanning device within the field of view of the user of the apparatus.

13. The apparatus of claim 8, wherein the processor is further configured to: render the scanning area in a third graphical characteristic of the scanning area that is different from the first graphical characteristic and the second graphical characteristic, in response to determining that the target object is not located within the scanning area.

14. A computer program product comprising at least one non-transitory computer-readable storage medium having computer-executable program code stored therein, the computer-executable program code comprising program code instructions configured to:
   detect, by a first camera, a target object within a field of view of a user of an augmented reality viewing device, wherein the computer-executable program code comprises program code instructions configured to:
   analyze, by a second camera, one or more parameters associated with the target object to identify that the object is the target object, wherein the first camera and the second camera are different;
   render a scanning area representing an active read area within the field of view of the user of the augmented reality viewing device, wherein the scanning area comprises a three-dimensional representation of the active read area in a first graphical characteristic of the scanning area;
   in response to determining that the target object is located within the active read area, render the three-dimensional representation of the active read area in a second graphical characteristic of the scanning area that is different from the first graphical characteristic, wherein a change from the first graphical characteristic to the second graphical characteristic is gradual relative to an area of the target object within the scanning area; and
   in response to the target object being in the scanning area, capture, by the second camera, an image of the target object.

15. The computer program product of claim 14, further comprising program code instructions configured to: render a polygon representation of the active read area.

16. The computer program product of claim 14, wherein the first camera is a wide angle detection camera for detecting the target object within the field of view of the user of the augmented reality viewing device.

17. The computer program product of claim 14, wherein the second camera is a narrow angle detection camera for analyzing the one or more parameters associated with the target object.

18. The computer program product of claim 14, further comprising program code instructions configured to: render a three-dimensional image of a scanning device in the field of view of the user of the augmented reality viewing device.

19. The computer program product of claim 14, further comprising program code instructions configured to: render the scanning area in a third graphical characteristic of the scanning area that is different from the first graphical characteristic and the second graphical characteristic, in response to determining that the target object is not located within the scanning area.

20. The computer program product of claim 14, further comprising program code instructions configured to: cause an audible sound to be emitted from the augmented reality viewing device.

* * * * *